Oct. 20, 1942.  O. A. DAMMEYER  2,299,310
TRANSPORTING AND LIFTING MECHANISM
Filed April 22, 1941  2 Sheets-Sheet 2
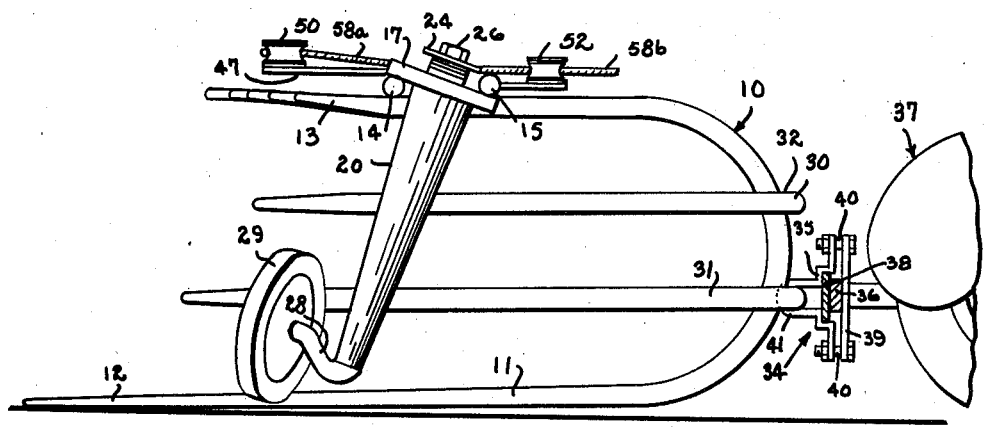
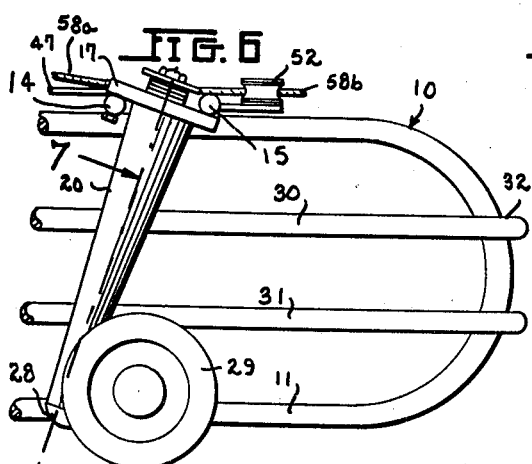
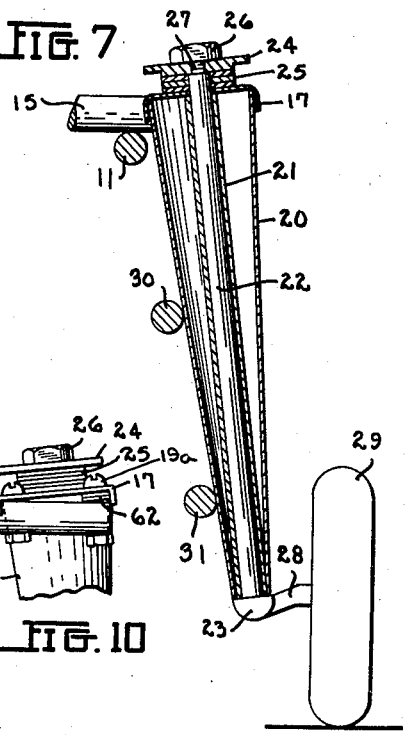
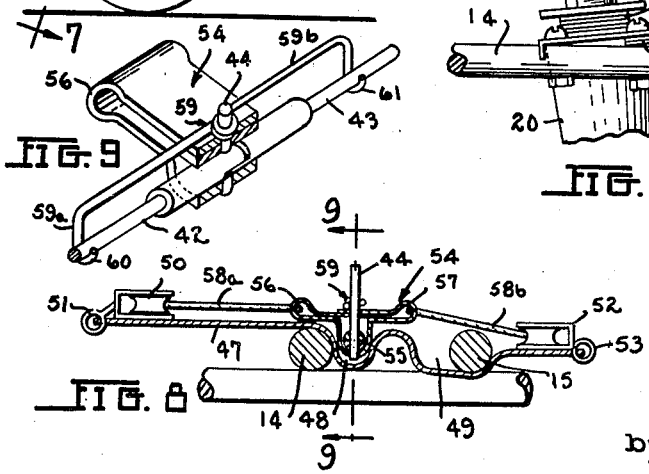
Inventor
OSCAR A. DAMMEYER
by Toulmin & Toulmin
Attorneys Patented Oct. 20, 1942

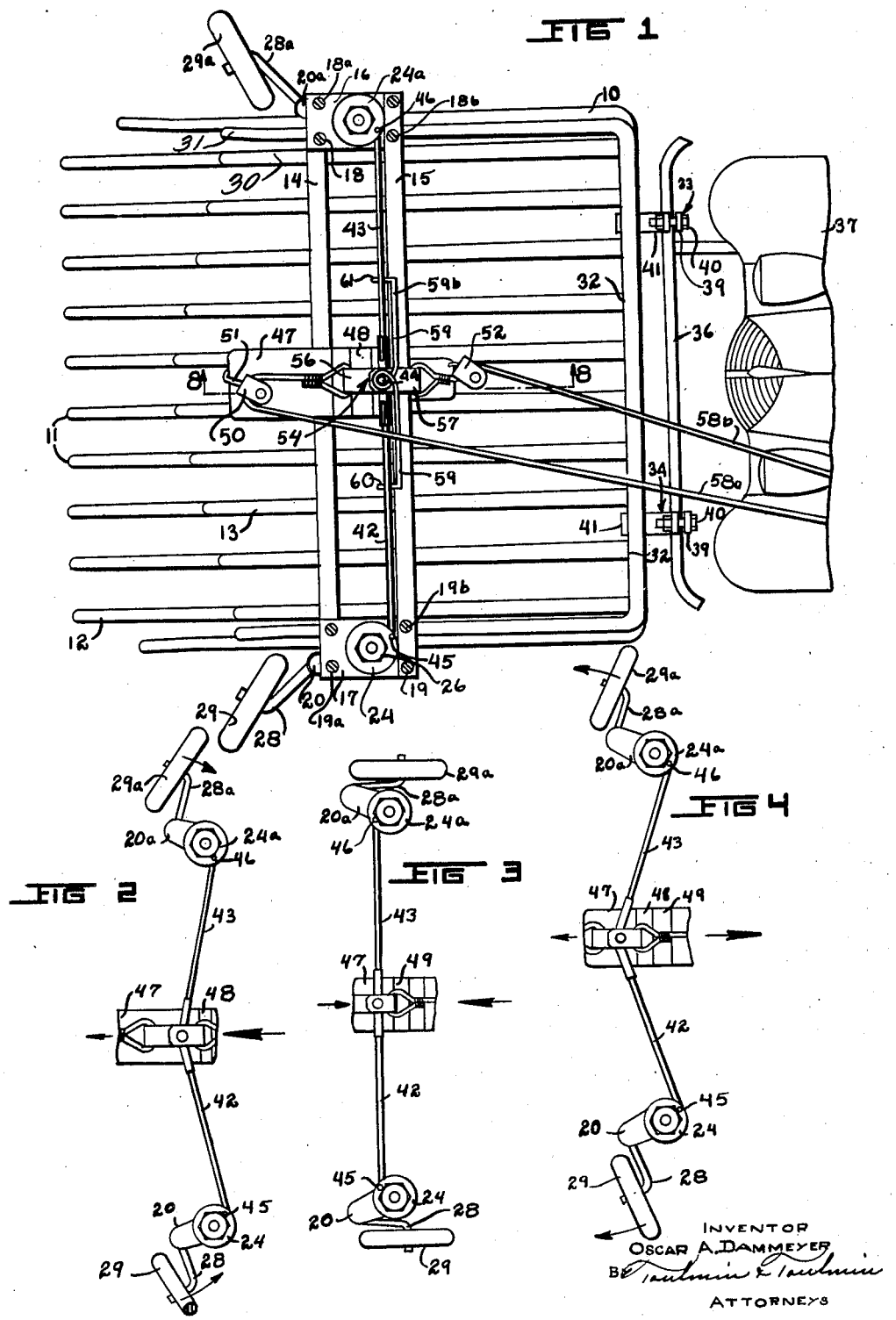

2,299,310

UNITED STATES PATENT OFFICE 2,299,310

TRANSPORTING AND LIFTING MECHANISM

Oscar A. Dammeyer, New Bremen, Ohio

Application April 22, 1941, Serial No. 389,799

18 Claims. (Cl. 56—27)

This invention relates to an apparatus adapted to be attached to a transporting vehicle for movement over the ground to pick up material from the ground and subsequently transport the material.

More specifically, the invention relates to a hayrake or similar apparatus which is adapted to move into the field along the row of hay for lifting the same from the ground, and without removing the hay from the apparatus, to transport the same directly to the place of storage.

An object of the invention is to provide a combination material gathering and transporting device which can be attached to any suitable motive vehicle.

It is another object of the invention to provide a gathering device which can be moved into a mass of material for placing the material upon the device, said device having a mechanism for lifting the supporting bed thereof from the ground in a manner to permit the bed to be transported bodily with the material thereon.

Another object of the invention is to provide a gathering and transporting device constructed and arranged in a manner that the material gathered by the device can be lifted from the ground and transported in the gathering device without necessitating transfer of the material to an independent transporting vehicle.

It is another object of the invention to provide a gathering and transporting device in accordance with the foregoing objects, which is adapted to be attached to the front end of a motor vehicle.

It is another object of the invention to provide a device in accordance with the foregoing objects, having retractible wheels for elevating the device from the ground after the device is loaded.

It is another object of the invention to provide a gathering and transporting device in accordance with the foregoing objects, constructed and arranged in a manner, and attached to the front end of a motor vehicle in a manner that the gathering and transporting device will follow directly the movements of the front end of the vehicle.

It is a more specific object of the invention to provide a material gathering and transporting device with retractible wheels constructed and arranged in a manner that actuation of the wheel supporting members will lift the bed of the device from the ground to permit the wheels to transport the device.

It is another object of the invention to provide a material gathering and transporting device with casterable wheels so arranged that when in one position, the wheels are out of contact with the ground, and when in another position, the wheels lift the device from the ground and place themselves in position for transporting the device over the ground.

It is another object of the invention to provide a material gathering and transporting device in accordance with the foregoing objects, which can be operated by the driver of a vehicle while seated with the same, which vehicle is providing power for moving the device.

It is another object of the invention to provide a material gathering and transporting device which is adapted to be attached to the bumper of an automotive vehicle in a manner that the device will follow directly the motions of the front end of the vehicle, and which device is provided with mechanism for raising and lowering the bed of the same with respect to the ground, which mechanism can be operated by the driver of the vehicle while seated behind the wheel of the vehicle.

Further objects and advantages will become apparent from the following description and the drawings.

In the drawings:

Figure 1 is a top plan view of a material gathering and transporting device of this invention shown attached to the bumper of a motor vehicle.

Figure 2 is a somewhat diagrammatic view of the operating mechanism for the wheels of the device shown in a position whereby the wheels are being castered in a rearward direction for lifting the bed of the device from the ground.

Figure 3 is a view similar to Figure 2 showing the wheels in position for transporting the device over the ground.

Figure 4 is a view similar to Figure 2 showing the wheels being castered in a forward direction for lowering the bed of the device to the ground.

Figure 5 is a side elevational view of the device of Figure 1, showing the device in position for gathering material from the ground.

Figure 6 is a partial side elevational view of the device showing the wheels in position for transporting the device.

Figure 7 is a cross-sectional view taken along line 7—7 of Figure 6.

Figure 8 is a cross-sectional view taken along line 8—8 of Figure 1.

Figure 9 is a perspective view partially in cross-section, and is taken substantially along line 9—9 of Figure 8.

Figure 10 is a partial elevational view of the supporting plate for the wheel supporting leg, showing the manner of adjusting the angular position of the leg.

This invention relates to a material gathering and transporting device adapted to be attached to the front end of a motor vehicle, which device is directed in its motion by the motion of the front of the motor vehicle. The material gathering and transporting device is provided with a set of wheels which is adapted to be moved either out of or in engagement with the ground for permitting the bed of the device to engage the ground or to lift the bed from the ground. The device is particularly adapted for movement into a mass of material which is to be moved from one place to another, the motor vehicle to which the device is attached forcing the same into the mass of material in a manner that the material is forced upon the bed of the device. The supporting wheels for the device are then actuated to cause the bed of the device to raise from the ground, the wheels assuming a proper aligned relation to permit transporting of the device by the motor vehicle.

After the device, with its load of material, has arrived at the proper destination, the wheels of the device are again actuated to permit the device to lower the bed to the ground. The motor vehicle is then backed away, carrying the material gathering and transporting device away from the load. After the load has been deposited and the transporting device removed from the same, the wheels of the device are again actuated to lift the bed of the device from the ground and it is now in condition to be returned to the location for taking on another load of material.

The apparatus of this invention will be described particularly with regard to a hayrake for gathering hay from the field and transporting it to the barn without necessity of transferring the hay to a separate vehicle. While the apparatus of this invention is described and disclosed with particularity with regard to means for gathering and transporting hay, yet the apparatus is not so limited in its field of operation. The device of this invention could be just as useful in other fields such as loading and transporting dirt, or it could be used in a manner to provide a cattle trailer which could be attached to an ordinary automotive vehicle. It may thus be seen that the apparatus has a wide field of use wherein the need for a device which can be lowered to the ground and elevated therefrom for transportation is required.

In this invention the hayrake consists of a body 10, which is constructed from a plurality of tines 11. The tines 11 are substantially U-shaped, having lower fingers 12 which are adapted to engage the ground during operation, and upper fingers 13 which are positioned horizontally with respect to the lower fingers 12 and in substantially parallel relation thereto. The upper fingers 13 tend to confine the mass of material within the U-shaped chamber formed by the plurality of tines.

The fingers 13 are secured to a pair of overhead axles 14 and 15 which are arranged in parallel relation with respect to each other. The axles 14, 15 support adjustable plate members 16 and 17 at opposite sides of the hayrake 10. The plates 16, 17 are secured to the axles 14, 15 by means of suitable screws 18 and 19.

The supporting plates 16, 17 carry conically shaped supporting leg members 20 and 20a the apex of the cones being positioned toward the bed of the hayrake 10 consisting of the plurality of fingers 12. The interior of each of the cones 20, 20a is provided with a sleeve 21 (see Figure 7) which provides a bearing for a spindle 22. The lower end of the spindle 22 is provided with an enlarged shoulder portion 23 which engages the lower end of the sleeve 21 and the cone 20. The upper end of the spindle 22 is provided with a reduced diameter portion, upon which a disc 24 is carried, the lower face of the disc resting upon the shoulder provided between the spindle 22 and the reduced diameter portion 27. The outer end of the reduced diameter portion 27 is threaded to receive a nut 26 which securely fastens the disc 24 to the spindle 22. Suitable washers 25 are provided between the disc 24 and the plate 17 to space the same with respect to the plate.

The lower ends of the spindles 22 provided in each of the legs 20, 20a carry the wheel axles 28, 28a. The axles 28, 28a are arranged upon an acute angle with respect to their respective spindles so that upon radial motion of the wheel about the spindle it will move upwardly or downwardly, depending upon the direction of its rotation, which function will be more explicitly hereinafter described. The axles 28, 28a carry the supporting wheels 29, 29a respectively.

The vertically arranged U-shaped tines 11 are secured together at the bases of their U-shaped portions by means of two or more horizontally positioned tines 30 and 31. The tines 30, 31 are secured to the U-shaped portions of the tines 11 at points indicated by the numeral 32, whereby the U-shaped portions of the tines 11 are prevented from a transverse spreading motion when the hayrake 10 is loaded with material. These tines 30, 31 may be secured to the cone shaped leg members 20, 20a if desired.

In order to attach the hayrake 10 to an automotive vehicle and particularly to the bumper of an automotive vehicle for transporting the hayrake to and from the field, a pair of brackets 33 and 34 are provided. These brackets are substantially U-shaped, and are adapted to partially encircle the lower horizontal tine 31 between two adjacent vertically arranged tines 11. The brackets 33 and 34 are provided with a shoulder portion 35 which receives a plate 38 adapted to engage the front face of the bumper 36 on a motor vehicle 37. A second plate 39 engages the rear face of the bumper 36. The brackets 33, 34 are secured to their respective plates 39 by means of the bolts 40, thereby clamping the bumper 36 between the plates 38 and 39. The U-shaped portion 41 of the bracket 34 provides a hinge having a horizontal axis for the hayrake 10. Since there are two brackets 33, 34 attached to the bumper 36, which brackets are spaced close to the side walls of the hayrake 10, it can readily be seen that the hayrake 10 will be directed through the identical motions of the front of the motor vehicle 37.

Such an arrangement provides for easy steering of the motion of the hayrake 10, and the driver of the vehicle need not learn the difficult art of directing a trailer element which is pivoted at a single joint, as is conventional in most trailer units. As heretofore mentioned, wheels 29, 29a are casterable upon the spindles 22 so that the wheels are free to rotate when directing the forward motion of the hayrake 10.

As indicated in Figures 5 and 6, the supporting legs 20, 20a are provided with a forward angle of inclination which determines the amount of lift which will be imparted to the hayrake 10 for raising the fingers 12 from the ground. The acute angle between the axle 28 and the spindle 22 imparts a leverage action for raising the body of the hayrake 10 from the ground so that the combined effect of the forward angle of inclination of the leg support members 20, 20a and the acute angle between the axles 28, 28a and their respective spindles determines the amount by which the body of the hayrake 10 will be lifted and the effective force provided by the wheels and their respective axles causing such lifting action.

The supporting legs 20, 20a are also provided with an outward angle of inclination, as shown in Figure 7. This outward angle of inclination insures that the wheels 29, 29a will always rotate in a predetermined direction, from front to rear of the hayrake 10. Also, this angle imparts a second leverage action upon the hayrake 10, to lift the same when the wheels 29, 29a rotate from their forward position to their rearward position. Thus, since the supporting legs 20, 20a are inclined both forwardly and outwardly, a large lifting force can be created to raise heavy loads carried by the hayrake 10.

In order to alter both the forward and outward angles of inclination, the plates 16, 17 carrying the legs 20, 20a are adjustably carried upon the axles 14, 15. The adjustment of the plates 16, 17 consists of positioning a plurality of shims between the plates and the axles 14, 15 (see Figure 10). These shims are placed between the plates and the axles at the points indicated by the screws 19a, 19b upon the plate 17 and by the screws 18a, 18b upon the plate 16. It will be noted that the forward edges of the plates 16 and 17 are positioned above the axle 14, while the rearward edges are placed below the axle 15. This arrangement prepositions the forward angle of inclination of the legs 20, 20a.

Since the shims around the screws 19a and 18a are above the axle 14, and the shims around the screws 19b and 18b are below the axle 15, it will be seen that alteration of the number of shims will change both the forward and outward angles of inclination of the supporting legs 20, 20a. It is thus possible to adjust the degree of lift imparted to the hayrake 10, should such adjustment become necessary.

The spindles 22 are connected by a tie-rod which is composed of two sections 42, 43 which are pivotally connected together by means of the pivot pin 44. The outer ends of the tie-rods 42, 43 are connected to the discs 24, 24a respectively by means of the pivotal connections 45, 46.

A guide plate 47 is secured to the axles 14, 15, and is provided with a groove 48 adjacent the front axle 14, and provides a groove 49 in cooperation with the rear axle 15. The forward end of the guide plate 47 carries a pulley 50 which is loosely supported upon the guide plate 47 by a link connection 51. A similar pulley 52 is provided adjacent the rear edge of the guide plate 47 and is connected to the plate by means of the link connection 53.

The tie-rods 42, 43 carry a substantially T-shaped member 54 having a U-shaped depending portion 55 which forms the stem of the T. The tie-rods 42, 43 pass through the U-shaped portion 55 and are adapted to rest therein. The ends of the head of the T are provided with ring portions 56, 57 to which opposite ends of a cable 58 are secured.

The cable 58 consists of two actuating lines 58a, 58b which extend into the motor vehicle 37 adjacent the driver's seat. The cable 58b is carried over the pulley 52, while the cable 58a is carried over the pulley 50 to provide free action, or reciprocation of the T-shaped member 54 for actuating the device as hereinafter described.

The pivot pin 44 for the mid-points of the tie-rods 42, 43 extends through the upper face of the T-shaped member 54 and has positioned thereon the central circular portion of a wire spring 59. The wire spring 59 is provided with leg portions 59a, 59b, the ends of which are provided with loops 60, 61 which extend around the tie-rods 42, 43 respectively. The spring 59 has a downwardly urging action upon the T-shaped member 54 so that the U-shaped stem 55 thereof will rest either in the groove 48 or 49, according to the specific position of the tie-rods 42, 43.

When the tie-rods are in the position as shown in Figure 1 it will be noted that the rear groove 49 provides a guide member for the U-shaped portion 55 of the T-member 54, whereby the mid-point of the tie-rod is prevented from buckling and the wheels 29, 29a will be carried in the position shown in Figure 1 and will be prevented from rotating about their spindles. The groove 48 provides the same function when the T-shaped member is adjacent the forward groove.

Figures 1 to 4 inclusive show the manner in which the device is operated, showing the various positions of mechanical elements to obtain the desired operation of the device. The hayrake as shown in Figure 1 is in position for movement along a row of hay, or for gathering hay scattered in a field. The wheels 29, 29a have been moved to their forward position and the tie-rods 42, 43 are prevented from buckling at their center point so that the wheels 29, 29a cannot rotate to their rearward position. With the wheels in this position, the forward ends of the fingers 12 engage the ground, the rear portion of the tines 11 being slightly raised from the ground so that the forward ends of the fingers 12 will maintain contact. The automotive vehicle 37 is then driven in a forward direction so that the fingers 12 will pass through hay to be collected and the same will enter into the U-shaped chamber provided by the tines 11.

When the hayrake 10 is filled, the cable 58a will be pulled in a rearward direction causing the T-shaped member 54 to move forwardly adjacent the pulley 50 (as shown in Figure 2). This motion breaks the center point of the tie-rods 42, 43.

The weight of the wheels 29, 29a will cause the same to revolve about their spindles 22 until they engage the ground. This action is caused due to the upward angle of inclination of the axles 28, 28a. When the wheels 29, 29a strike the ground the hayrake 10 can then be moved in a forward direction to cause the wheels 29, 29a to continue to swing upon their spindles 22 until they reach the position shown in Figure 3. The rearward rotation of the wheels 29, 29a has caused the wheels to move downwardly as well as rearwardly, whereby the hayrake 10 is lifted from the ground and is now in transportation position as shown in Figure 6.

Cable 58b will now be pulled in a rearward direction whereby the U-shaped portion 55 of the T member 54 will be caused to rest in the forward groove 48 of the guide member 47. The tie-rods 42, 43 thus form a rigid unit so that both wheels 29, 29a will track in the same direction when the hayrake is directed in its movement toward its destination by the motor vehicle 37. Since the hayrake is connected to the motor vehicle by means of two bracket members 33, 34, the rake can be readily guided in the same manner as guiding the motor vehicle 37. It is thus not necessary to learn how to handle the present apparatus.

When the hayrake has been taken to its destination and it is desired to deposit the hay carried therein, the cable 58a will again be pulled in a rearward direction, whereby the T-shaped member 54 is moved forward adjacent the pulley 50 in a position as shown in Figure 4. The motor vehicle 37 will then be moved in a rearward direction, and since the wheels 29, 29a are in engagement with the ground, the wheels will move in a forward direction about their spindles 22 as shown in Figure 4. When the wheels move forwardly they will also move in an upward direction due to the angle of inclination of the axles 28, 28a, and the supporting legs 20, 20a, until the hayrake 10 rests upon the ground.

The cable 58b will then be pulled in a rearward direction to bring the U-shaped portion of the T member 54 into the rear groove 49 as shown in Figure 1. The motor vehicle can then be backed away and since the material rests upon the floor between the tines 11, the friction of the material will permit the hayrake to be moved rearwardly and remove the hay from the hayrake.

To bring the rake 10 into transportation position for returning the same to the field, the cable 58a is pulled in a rearward direction and the motor vehicle 37 moved in a forward direction whereby the action shown in Figure 2 takes place to raise the rake 10 from the ground.

Upon arriving in the field, and desiring to place the rake in operating position with the tines in engagement with the ground, the cable 58a is again pulled in a rearward direction and the motor vehicle 37 moved in a rearward direction, whereby the action shown in Figure 4 takes place, and upon filling of the hayrake 10 by a forward motion of the vehicle 37, the cycle just described can be repeated.

It is thus seen that the device of this invention provides an apparatus which will pick up material from the ground and without requiring the necessity of change of vehicle, the material can be transpoorted to a particular destination, at which the material can be lowered for storage purposes. Also, the apparatus of this invention provides a mechanism which can be attached to an ordinary passenger vehicle and can be guided in the same manner as the vehicle. Again, operation of the device is controlled entirely by the driver of the vehicle so that one man can perform the entire function of loading and transporting material from the field to a place of destination without removing himself from the vehicle.

Having thus fully described my invention of what I claim is new and desire to secure by Letters Patent, is:

1. A material transporting device comprising a scoop, caster wheels having the wheel axis off-center from the spindle thereof carried by said scoop and having their spindle means positioned angularly with respect to the vertical and with the upper end of said spindle tilted rearwardly with respect to the rear end of said scoop, tie rod means, means extending from said spindles to which said tie rod means is secured, a pivot joint connecting the tie rod means extending from said spindles, and means for breaking said joint to permit said wheels to rotate upon said spindles in a direction from the front to the rear of said scoop.

2. A material transporting device adapted to be attached to a motor vehicle, comprising a scoop, caster wheels having the wheel axis off-center from the spindle thereof carried by said scoop and having the spindles positioned angularly with respect to the vertical and with the upper end of said spindle tilted rearwardly with respect to the rear end of said scoop, said wheels rotating angularly with respect to the horizontal when rotating upon said spindles to raise or lower said scoop with respect to the ground.

3. A material transporting device adapted to be attached to a motor vehicle comprising a scoop, caster wheels having the wheel axis off-center from the spindle thereof carried by said scoop and having the spindles positioned angularly with respect to the vertical and with the upper end of said spindle tilted rearwardly with respect to the rear end of said scoop whereby said wheels rotate angularly with respect to the horizontal when rotating upon said spindles, said wheels being adapted to engage the ground when said scoop is moved in a forward direction to rotate said wheels rearwardly upon their spindles during forward movement of the scoop to elevate the same, and being adapted to rotate upon their spindles in a forward direction when said scoop is moved in a rearward direction to return said scoop into engagement with the ground upon rotation of said wheels upon their spindles during rearward movement of said scoop.

4. A material transporting device adapted to be attached to a motor vehicle comprising a scoop, caster wheels having the wheel axis off-center from the spindle thereof carried by said scoop and having the spindles positioned angularly with respect to the vertical and with the upper end of said spindle tilted rearwardly with respect to the rear end of said scoop whereby said wheels rotate angularly with hespect to the horizontal when rotating upon said spindles, said wheels being adapted to engage the ground when said scoop is moved in a forward direction to rotate said wheels rearwardly upon their spindles during forward movement of the scoop to elevate the same, and being adapted to rotate upon their spindles in a forward direction when scoop is moved in a rearward direction to return said scoop into engagement with the ground upon rotation of said wheels upon their spindles during rearward movement of said scoop, a tie rod segment connected to each of said spindles off-center from the axis thereof, a flexible joint connecting said tie rod segments, means for holding said segments in coaxial alignment, and means for selectively controlling releasing said flexible joint from said holding means to permit rotation of said spindles to move said wheels forwardly and rearwardly with respect to said scoop.

5. A material transporting device comprising a material supporting bed, caster wheels having the wheel axis off-center from the spindle thereof carried by said bed and having the spindles thereof positioned angularly with respect to the vertical and with the lower end of said spindle pitched forwardly with respect to the forward end of said bed and outwardly therefrom to cause said wheels to move angularly with respect to the horizontal and outwardly with respect to said bed when rotated upon said spindles to raise and lower said scoop.

6. A material transporting device comprising a material supporting bed, caster wheels having the wheel axis off-center from the spindle thereof carried by said bed and having the spindles thereof positioned angularly with respect to the vertical and with the lower end of said spindle pitched forwardly with respect to the forward end of said bed and outwardly therefrom to cause said wheels to move angularly with respect to the horizontal and outwardly with respect to said bed when rotated upon said spindles to raise and lower said scoop, said wheels elevating said bed upon rearward rotation thereof and lowering the same upon forward rotation.

7. A material transporting device comprising a material supporting bed, caster wheels having the wheel axis off-center from the spindle thereof carried by said bed and having the spindles thereof positioned angularly with respect to the vertical and with the lower end of said spindle pitched forwardly with respect to the forward end of said bed and outwardly therefrom to cause said wheels to move angularly with respect to the horizontal and outwardly with respect to said bed when rotated upon said spindles to raise and lower said scoop, said wheels elevating said bed upon rearward rotation thereof and lowering the same upon forward rotation, and means for changing the degree of forward and outward angles of inclination of said spindles.

8. A material scoop comprising a bed, axle means supporting said bed, spindle means rotatably carried by said axle means and positioned angularly with respect to the vertical with the lower end of said spindle means being positioned forwardly of the upper end thereof with respect to the forward end of said bed, a wheel supporting arm extending from said spindle means and disposed angularly thereto, and a wheel carried by said arm, said spindles being rotated upon forward or rearward motion of said bed to caster said wheels forwardly and rearwardly with respect to said bed, said arms carrying said wheels angularly with respect to the horizontal to raise and lower said bed.

9. A material scoop comprising a bed, axle means supporting said bed, spindle means rotatably carried by said axle means and positioned angularly with respect to the vertical with the lower end of said spindle means being positioned forwardly of the upper end thereof with respect to the forward end of said bed, a wheel supporting arm extending from said spindle means and disposed angularly thereto, a wheel carried by said arm, said spindles being rotated upon forward or rearward motion of said bed to caster said wheels forwardly and rearwardly with respect to said bed, said arms carrying said wheels angularly with respect to the horizontal to raise and lower said bed, tie rod means for interconnecting said spindles, and means extending from said spindle for connecting to said tie rod means to retain said wheels in parallel running relationship.

10. A material scoop comprising a bed, axle means supporting said bed, spindle means rotatably carried by said axle means and positioned angularly with respect to the vertical with the lower end of said spindle means being positioned forwardly of the upper end thereof with respect to the forward end of said bed, a wheel supporting arm extending from said spindle means and disposed angularly thereto, a wheel carried by said arm, said spindles being rotated upon forward or rearward motion of said bed to caster said wheels forwardly and rearwardly with respect to said bed, said arms carrying said wheels angularly with respect to the horizontal to raise and lower said bed, tie rod means for interconnecting said spindles, means extending from said spindles for connecting said tie rod means to retain said wheels in parallel running relationship, said tie rod means having a flexible joint therein to permit the ends of said tie rod means to approach each other and shorten the same when said wheels caster upon their spindles, and means for holding said flexible joint to prevent flexing thereof when said wheels are in forward or rearward positions with respect to said scoop.

11. A material scoop comprising a bed, axle means supporting said bed, spindle means rotatably carried by said axle means and positioned angularly with respect to the vertical with the lower end of said spindle means being positioned forwardly of the upper end thereof with respect to the forward end of said bed, a wheel supporting arm extending from said spindle means and disposed angularly thereto, a wheel carried by said arm, said spindles being rotated upon forward or rearward motion of said bed to caster said wheels forwardly and rearwardly with respect to said bed, said arms carrying said wheels angularly with respect to the horizontal to raise and lower said bed, tie rod means for interconnecting said spindles, means extending from said spindles for connecting said tie rod maens to retain said wheels in parallel running relationship, said tie rod means having a flexible joint therein to permit the ends of said tie rod means to approach each other and shorten the same when said wheels caster upon their spindles, means for holding said flexible joint to prevent flexing thereof when said wheels are in forward or rearward position with respect to said scoop, and means for releasing said flexible joint from said holding means to permit castering movement of said wheels, said last mentioned means extending to a position remote from said scoop.

12. A material scoop comprising a bed, axle means supporting said bed, spindle means rotatable carried by said axle means and positioned angularly with respect to the vertical with the lower end of said spindle means being positioned forwardly of the upper end thereof with respect to the forward end of said bed, a wheel supporting arm extending from said spindle means and disposed angularly thereto, a wheel carried by said arm, said spindles being rotated upon forward or rearward motion of said bed to caster said wheels forwardly and rearwardly with respect to said bed, said arms carrying said wheels angularly with respect to the horizontal to raise and lower said bed, tie rod means for interconnecting said spindles, means extending from said spindles for connecting said tie rod means to retain said wheels in parallel running relationship, said tie rod means having a flexible joint therein to permit the ends of said tie rod means to approach each other and shorten the same when said wheels caster upon their spindles, means for holding said flexible joint to prevent flexing thereof when said wheels are in forward or rearward position with respect to said scoop, means for releasing said flexible joint from said holding means to permit castering movement of said wheels, said last mentioned means extending to a position remote from said scoop, and means for attaching said scoop to the front end of a motor vehicle to permit vertical movement of said scoop but no transverse movement thereof with respect to said vehicle to maintain a parallel relationship between said vehicle and said scoop during transportation thereof and follow directly the motion of the front end of the motor vehicle.

13. A material transporting device comprising a bed, means supporting an axle a substantial distance above said bed to permit material to be loaded upon said bed and under said axle, said axle being disposed transversely of said bed, spindle bearing means carried by said axle and extending downwardly adjacent the sides of said bed, spindles rotatably positioned in said bearings, said spindles and said bearings being disposed at a forwardly directed angle with respect to the forward end of said bed, arm means extending from said spindles and disposed angularly thereto, wheel means carried by said arm means, tie rod means secured to said spindles in off-center relationship thereto to prevent independent rotation of said spindles, a breakable joint in said tie rod, means for holding the segments of said tie rod in aligned relationship to position said wheels carried by said spindles in a forward or rearward position with respect to said bed, and means for releasing said breakable joint from said holding means to permit rotation of said spindles and thereby movement of said wheels forwardly and rearwardly of said bed to raise and lower the same.

14. A material transporting device comprising a bed, means supporting an axle a substantial distance above said bed to permit material to be loaded upon said bed and under said axle, said axle being disposed transversely of said bed, spindle bearing means carried by said axle and extending downwardly adjacent the sides of said bed, spindles rotatably positioned in said bearings, said spindles and said bearings being disposed at a forwardly directed angle with respect to the forward end of said bed, arm means extending from said spindles and disposed angularly thereto, wheel means carried by said arm means, tie rod means secured to said spindles in off-center relationship thereto to prevent independent rotation of said spindles, a breakable joint in said tie rod, means for holding the segments of said tie rod in aligned relationship to position said wheels carried by said spindles in a forward or rearward position with respect to said bed, means for releasing said breakable joint from said holding means to permit rotation of said spindles and thereby movement of said wheels forwardly and rearwardly of said bed to raise and lower the same, and means to change the angular position of said spindle bearings with respect to said axle.

15. A material transporting device comprising a bed, means supporting an axle a substantial distance above said bed to permit material to be loaded upon said bed and under said axle, said axle being disposed transversely of said bed, spindle bearing means carried by said axle and extending downwardly adjacent the sides of said bed, spindles rotatably positioned in said bearings, said spindles and said bearings being disposed at a forwardly and an outwardly directed angle with respect to said bed, arm means extending from said spindles and disposed angularly thereto, wheel means carried by said arm means, tie rod means secured to said spindles in off-center relationship thereto to prevent independent rotation of said spindles, a breakable joint in said tie rod, means for holding the segments of said tie rod in aligned relationship to position said wheels carried by said spindles in a forward or rearward position with respect to said bed, means for releasing said breakable joint from said holding means to permit rotation of said spindles and thereby movement of said wheels forwardly and rearwardly of said bed to raise and lower the same, and means to change the angular position of said spindle bearings with respect to said axle.

16. A material supporting device comprising a bed, an axle extending transversely of said bed and positioned a substantial distance thereabove to permit loading of material upon said bed and below said axle, spindle bearings carried by said axle and extending downwardly adjacent opposite sides of said bed, the lower ends of said bearings being disposed forwardly of the upper ends thereof with respect to the forward end of said bed, spindle means rotatably positioned within said bearings, arm means extending from said spindle means, wheel means carried by said arm means, a tie rod segment connected to said spindle off-center from the axis thereof, a breakable joint connecting said tie rod segments, means for maintaining alignment of said tie rod segments when said spindles position said wheels toward the forward end of said bed, means for breaking said breakable joint to permit rotation of said spindles and for movement of said wheels toward a rearward position with respect to said bed, and means for maintaining alignment of said tie rod segment when said wheels are in the rearward position.

17. A material transporting device comprising an axle, means for suspending a material receiving bed a substantial distance below said axle to permit loading of material upon said bed and below said axle, spindle means rotatably carried by said axle means and positioned angularly with respect to the vertical with the lower end of said spindle means being positioned forwardly of the upper end thereof with respect to the forward end of said bed, a wheel supporting arm extending from said spindle means and disposed angularly thereto, and a wheel carried by said arm, said spindles being rotated upon forward or rearward motion of said bed to caster said wheels forwardly and rearwardly with respect to said bed, said arms carrying said wheels angularly with respect to the horizontal to raise and lower said bed.

18. A material scoop comprising a substantially U-shaped bed having the legs of the U arranged vertically to dispose the throat of the U horizontally, axle means carried by the upper wall of said bed, spindle means rotatably carried by said axle means and positioned angularly with respect to the vertical with the lower end of said spindle means being positioned forwardly of the upper end thereof with respect to the forward end of said bed, a wheel supporting arm extending from said spindle means and disposed angularly thereto, and a wheel carried by said arm, said spindles being rotated upon forward or rearward motion of said bed to caster said wheels forwardly and rearwardly with respect to said bed, said arms carrying said wheels angularly with respect to the horizontal to raise and lower said bed.

OSCAR A. DAMMEYER.